No. 665,587. Patented Jan. 8, 1901.
J. TANNEHILL.
ATTACHMENT FOR CORN PLANTERS.
(Application filed July 7, 1900.)
(No Model.)
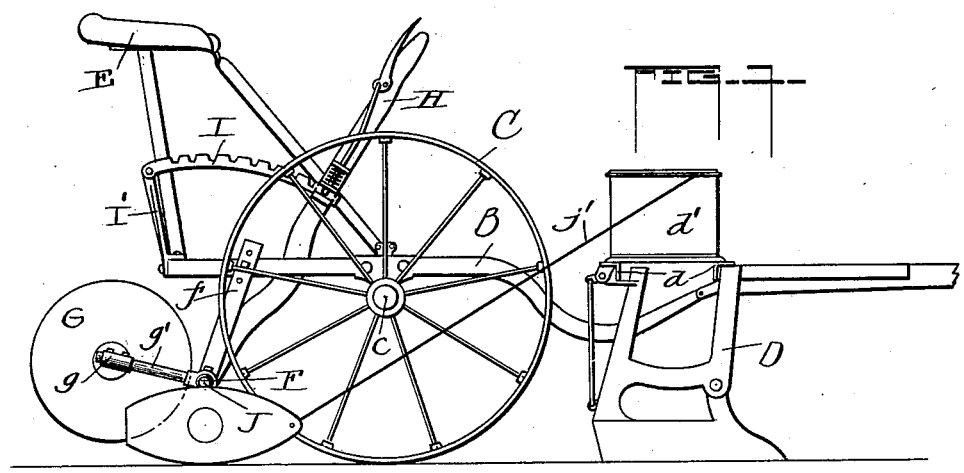
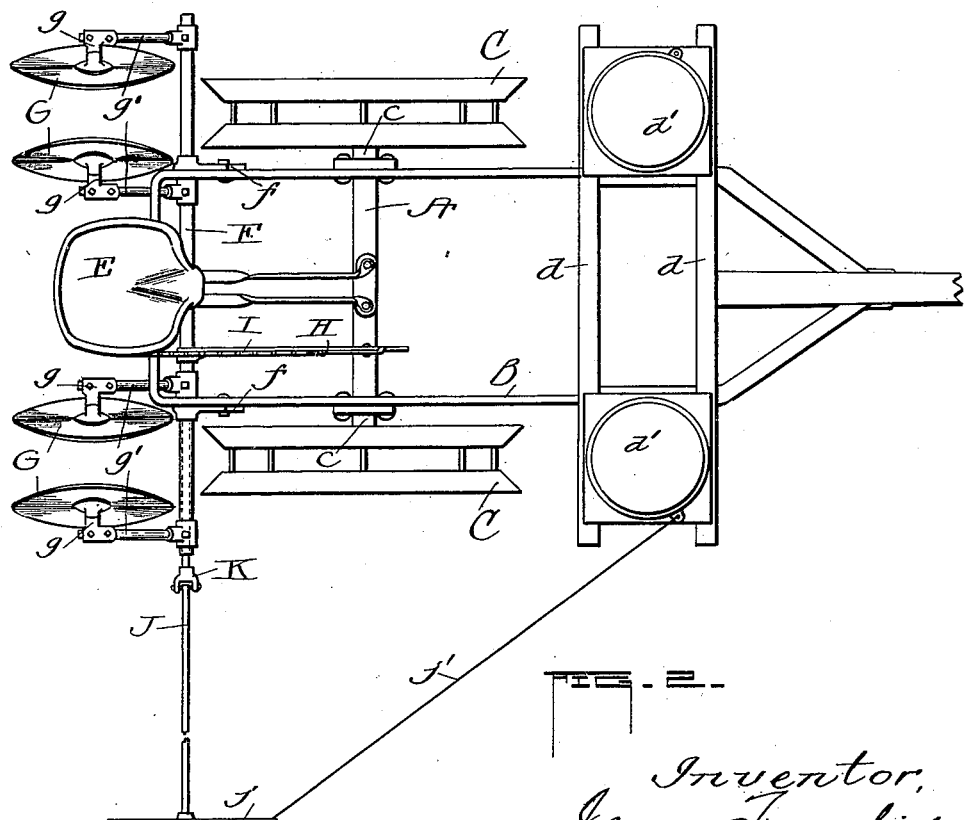

UNITED STATES PATENT OFFICE.

JAMES TANNEHILL, OF WALNUT GROVE, ILLINOIS.

ATTACHMENT FOR CORN-PLANTERS.

SPECIFICATION forming part of Letters Patent No. 665,587, dated January 8, 1901.

Application filed July 7, 1900. Serial No. 22,861. (No model.)

*To all whom it may concern:*

Be it known that I, JAMES TANNEHILL, a citizen of the United States, residing at Walnut Grove, in the county of McDonough and State of Illinois, have invented certain new and useful Improvements in Attachments for Corn-Planters; and I do hereby declare that the following is a full, clear, and exact description of the invention, which will enable others skilled in the art to which it appertains to make and use the same.

My invention relates to a cultivator attachment for corn-planters, and has for its object to provide a strong, simple, and efficient cultivator attachment applicable to all well-known corn-planters and combining therewith novel means for raising or depressing the cultivator-disks.

My invention consists, further, of the combination, with the cultivator and its means of attachment to a corn-planter, of a marker having a detachable and adjustable connection therewith.

The invention further consists in the provision of certain details of construction hereinafter more particularly described in the specification and pointed out in the appended claims.

In order that the invention may be more fully understood, reference is had to the accompanying drawing, in which the figure represents a side elevation of a corn-planter having my improved cultivator attachment attached thereto.

In the present invention I have aimed to construct for corn-planters a cultivator attachment which is composed of suitable parts applicable to all well-known planters and arranged to be carried by the rear frame part thereof, that the cultivator-disks may follow in the wake of the corn-planter wheels.

The object I have in view with the appliance such as I shall hereinafter more fully describe in detail is to provide for a corn-planter a cultivator attachment composed of suitable frame parts and cultivator-disks arranged for vertical adjustment and to travel in the wake of the wheels to cut out and destroy any and all weeds and grass which may be growing in the path of travel of the planter-wheels. The action of the cultivator-disks will form a ridge over the row of corn, so as to keep water from settling in the row, preventing any washing out or flooding of the corn, which will prevent the ground from baking over the corn, a further result being in covering all the corn which the planter-wheels fail to cover. With the application of such a device time is saved by accomplishing with one trip over the field what is usually accomplished by a separate trip with a cultivator. With this device I have provided, as above set forth, a marker combining in its construction and application with the cultivator a novel marker, which makes the application of the cultivator desirable because of such arrangement, the same being adjustable in connection with the cultivator and coupled in such a manner as to permit the same to be raised or lowered.

In the following description it will be observed that I have referred to the necessary parts common to all machines and then to the parts comprising the cultivator attachment upon which I desire protection.

In the drawing, A refers generally to a rectangular frame-support, to which is suitably attached the main frame B of the planter, and C represents the ordinary planter-wheels journaled on the short axles $c$, carried in a suitable manner by the frame B.

D refers to the planter-shanks carried forward of the planter, joined by the angle frame-supports $d\,d$, to which the frame B is attached, completing the machine-frame, and above the shanks D and connecting therewith are carried the usual seed-hoppers $d'$, as shown.

The usual driver's seat E is shown supported by the machine-frame in the ordinary manner.

The above-described parts constitute the main elements of a corn-planter, with a few additional details, and I will now proceed to describe in detail the cultivator attachment upon which I make claim.

To the rear of the center of the machine and at a point adjacent to the peripheral face of the planter-wheels C and below the center of the same I have shown a hollow rock-shaft F, extending transversely across the machine, which is journaled in the depending frame-supports $f$, shown having a vertical adjusting relation on the machine-frame B of the planter.

G represents cultivator-disks, a pair of which are located and arranged in such a manner as to travel in the wake of the planter-wheels C, as shown. These are shown having the short hub or journal extensions g, that the same may have an adjustable connection with the spindles g', which are supported by the rock-shaft F, this method of supporting the disks providing a means of adjusting the same to desired angles.

A simple means is shown employed for actuating the rock-shaft F, that the cultivator-disks may be simultaneously raised or depressed, as is desired, which may be further attained through the provision of the brackets f, in which the rock-shaft is journaled, which is capable of vertical adjustment on the machine-frame, as shown. This I accomplish by the provision of a hand-lever H, shown rigidly secured or fixed at one end to the rock-shaft F, provided with the usual thumb, latch, rod, and sliding pawl arranged to engage with a segmental rack I, attached at one end to the machine-frame, whereby the lever may be engaged at suitable points in its throw for holding the disks at desired points in their adjustment.

Referring to the segmental rack I, it will be noticed that the rack is pivoted at its rear end to an upright support I', attached to the frame B in any suitable manner, and the outer end of the rack is left free. This provision will permit the rack to have a swinging movement which will permit it to adjust itself when the rock-shaft is adjusted by reason of a raising or lowering of the brackets supporting the same. In this connection I have provided a very novel means of attaching and adjusting the marker, which consists in the provision of a telescoping rod or bar J, capable of being telescoped into either end of the rock-shaft and carries on its outer end the ordinary marker j, which may be held in alinement by the use of the ordinary cord j', which is held by a loop which at its opposite end is attached to a suitable hook on the seeder-hopper. The bar or rod J is provided at a suitable point in its length with a knuckle-joint K, as shown, which permits of the outer end being raised or lowered or to give to the rise and fall of the ground as the marker travels over the same.

It will be noticed in the provision of a cultivator attachment such as I have shown, illustrated, and described that the same is capable of attachment to all ordinary planters now in use, and ample provision is made for the use of a marker, which makes it all that is desired by the use of a cultivator attachment for corn-planters.

Having thus fully described my invention, what I claim, and desire to secure by Letters Patent of the United States, is—

1. A cultivator attachment for corn-planters, comprising a rock-shaft journaled in vertically-adjustable brackets to the planter-frame, cultivator-disks supported by the rock-shaft and arranged to travel, a pair of each in the wake of the planter-wheels, the mechanism for actuating the rock-shaft to raise or depress the disks and means whereby the angles may be changed as desired, substantially as described.

2. An attachment for corn-planters, comprising a hollow rock-shaft supported in vertically-adjustable journals detachably secured to the planter-frame, cultivator-disks supported, a pair at each end by the rock-shaft to travel in the wake of the planter-wheels, the combination therewith, of a marker secured to a telescoping rod with the hollow rock-shaft, means for raising the disks and means for raising the outer end of the marker, all substantially as described and shown.

3. In a corn-planter attachment, the combination of a hollow rock-shaft supported transversely at the rear of the planter in brackets depending from the planter-frame, cultivator-disks adjustable to suitable angles and height traveling in the wake of the planter-wheels, a rod or bar capable of being telescoped into either end of said rock-shaft and carrying a marker on its outer end, and provided with a knuckle-joint intermediate its length, all arranged and operating substantially in the manner and for the purpose described.

4. The combination with a corn-planter, of a cultivator attachment and marker comprising the hollow rock-shaft F, journaled in the vertically-adjustable supports f, cultivator-disks G, a pair located at opposite sides of the planter in the wake of the planter-wheels, supported by the rock-shaft and arranged to be adjusted to suitable angles, the means for actuating the rock-shaft for the purpose described, the telescoping rod J, provided with the marker j, the knuckle-joint K, at a suitable point in the telescoping rod to permit the outer end to rise or lower, all substantially as described.

5. An attachment for corn-planters, comprising a hollow rock-shaft supported in vertically-adjustable brackets to the planter-frame, cultivator-disks supported by the rock-shaft, a hand-lever attached to said rock-shaft and provided with means for engaging a segmental rack attached to the machine, the same having a pivotal bearing relation with a suitable support whereby the same will adjust itself automatically to the adjustment of the vertically-adjustable brackets supporting the rock-shaft, substantially as described.

In witness whereof I affix my signature in presence of two witnesses.

JAMES TANNEHILL.

Witnesses:
ROBERT N. McCORMICK,
CHAS. W. LA PORTE.